US007305418B2

(12) United States Patent
Benhase et al.

(10) Patent No.: US 7,305,418 B2
(45) Date of Patent: Dec. 4, 2007

(54) SELECTING AND SHOWING COPY PAIRS IN A STORAGE SUBSYSTEM COPY SERVICES GRAPHICAL USER INTERFACE

(75) Inventors: Linda Van Patten Benhase, Tucson, AZ (US); Mary Catherine Burton, Tucson, AZ (US); Shekhar Gajanan Kale, Sunnyvale, CA (US); Amy Nicole Morris, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/701,706

(22) Filed: Nov. 5, 2003

(65) Prior Publication Data

US 2005/0097145 A1    May 5, 2005

(51) Int. Cl.
*G06F 12/00* (2006.01)
(52) U.S. Cl. ..................... 707/200; 707/202
(58) Field of Classification Search .............. 707/101, 707/200; 711/165; 714/5; 715/776; 345/440
See application file for complete search history.

(56) References Cited

U.S. PATENT DOCUMENTS

| 5,065,347 | A | * | 11/1991 | Pajak et al. .................. 715/835 |
| 5,410,667 | A | | 4/1995 | Belsan et al. ................. 711/114 |
| 5,623,669 | A | | 4/1997 | Kincaid ........................ 707/205 |
| 5,835,954 | A | | 11/1998 | Duyanovich et al. ......... 711/162 |
| 5,953,017 | A | * | 9/1999 | Beach et al. ................. 345/440 |
| 6,108,749 | A | | 8/2000 | White et al. .................. 711/112 |
| 6,128,699 | A | | 10/2000 | Golding ........................ 711/112 |
| 6,131,148 | A | | 10/2000 | West et al. ................... 711/162 |
| 6,145,066 | A | | 11/2000 | Atkin ........................... 711/165 |
| 6,157,991 | A | | 12/2000 | Arnon ........................... 711/161 |
| 6,321,239 | B1 | | 11/2001 | Shackelford ................. 707/206 |
| 6,324,654 | B1 | | 11/2001 | Wahl et al. ...................... 714/6 |
| 6,415,296 | B1 | | 7/2002 | Challener et al. ............ 707/200 |
| 6,457,109 | B1 | | 9/2002 | Milillo et al. ................ 711/162 |
| 6,577,735 | B1 | * | 6/2003 | Bharat ........................... 380/286 |
| 6,912,539 | B1 | * | 6/2005 | Kapitanski et al. ........... 707/101 |
| 7,096,269 | B2 | * | 8/2006 | Yamagami .................... 709/229 |
| 2004/0088397 | A1 | * | 5/2004 | Becker et al. ............... 709/223 |
| 2004/0123180 | A1 | * | 6/2004 | Soejima et al. ................. 714/5 |

FOREIGN PATENT DOCUMENTS

WO    WO98/48347    10/1998

* cited by examiner

*Primary Examiner*—Susan Chen
(74) *Attorney, Agent, or Firm*—Scully, Scott, Murphy & Presser, P.C.

(57) ABSTRACT

Disclosed are a method and system for pairing objects for the purpose of copying data. The method comprises the steps of selecting such pairs in a single view including graphical depictions of representations of storage resources, and implementing checks and alert messages regarding such pairings based on predefined rules. Preferably, these graphical depictions are side-by-side depictions in the single view of a logical configuration of the storage resources, and, for example, these depictions may be hierarchical trees. Preferably, users are able to select a single source and target volume and/or to select blocks of source and target volumes using familiar computer controls, and users may also confirm their selections before committing to them. These volumes may be in the same or different storage subsystems. In addition, some error checking and/or error handling, with an appropriate error message is preferably built into the tool of this invention.

3 Claims, 2 Drawing Sheets

FIG. 2

| Source | | Target | |
|---|---|---|---|
| Resource | Status | Resource | Status |
| ▯ ESS | | ▯ ESS | |
| └ ▯ 16277 | | └ ▯ 16277 | |
|    └ ▯ LSS 22 | |    └ ▯ LSS 22 | |
|       ├ ▯ Volume 00 | ◇ |       ├ ▯ Volume 00 | ⚡ |
|       ├ ▯ Volume 01 | ▭ |       ├ ▯ Volume 01 | ⚡ |
|       ├ (00) Volume 02 | |       ├ (00) Volume 02 | |
|       ├ ▯ Volume 03 | ▭ |       ├ ▯ Volume 03 | ▭ |
|       ├ ▯ Volume 04 | ▭ |       ├ (01) Volume 04 | ○ |
|       ├ ▯ Volume 05 | ▭ |       ├ ▯ Volume 05 | ▭ |
|       ├ (01) Volume 06 | |       ├ ▯ Volume 06 | ▭ |
|       └ ▯ Volume 07 | ○ |       └ ▯ Volume 07 | ○ |
|    └ ▯ LSS 23 | ▭ |    └ ▯ LSS 23 | ▭ |
| └ ▯ 16496 | | └ ▯ 16496 | |

| Source | Target | | Swap Targets |
|---|---|---|---|
| 16277:22 Vol.03 CKD 3339 | 16946:16 Vol.02 CKD 3339 | ⚠ | |
| 16277:22 Vol.07 FB 7812544 | 16496:16 Vol.05 FB 7812544 | | |

32

30

SELECTING AND SHOWING COPY PAIRS IN A STORAGE SUBSYSTEM COPY SERVICES GRAPHICAL USER INTERFACE

BACKGROUND OF THE INVENTION

1. Field of the Invention

The present invention generally relates to data storage systems; and more specifically, the invention relates to using a graphical user interface for pairing objects for the purpose of copying data within the same storage subsystem or between two different storage subsystems.

2. Background Art

With increasingly large amounts of data being handled in data processing systems, storage systems, such as disk storage subsystems, are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system may be employed to minimize the time in which access to data is lost or unavailable.

With presently available techniques for copying data, a user is required to establish pairs of volumes—one volume of data storage from which data are to be copied, and one volume of data storage to which the data are to be copied. Current techniques require operator intensive actions to set up the necessary pairs of volumes; and because of this, these techniques are time consuming and difficult to learn.

SUMMARY OF THE INVENTION

An object of this invention is to improve methods and systems for pairing objects for the purpose of copying data. The data may be copied within the same storage subsystem or between two different storage subsystems.

Another object of the invention is to allow a user, for purposes of creating a copy relationship, to select a single source and target volume and/or to select blocks of source and target volumes using familiar computer controls.

A further object of the present invention is to provide a user with the ability to determine, when creating copy relationships between pairs of volumes in a storage subsystem product, which volume is paired with which other volume.

Another object of the invention is to allow users of a storage subsystem copy services product both to view and to change copy pairs when creating copy relationships between pairs of volumes in the storage subsystem.

These and other objects are attained with a method and system for pairing objects for the purpose of copying data. The method comprises the steps of selecting such pairs in a single view including graphical depictions of representations of storage resources, and implementing checks and alert messages regarding such pairings based on predefined rules. Preferably, these graphical depictions are side-by-side depictions in the single view of a logical configuration of the storage resources, and, for example, these depictions may be hierarchical trees.

With the preferred embodiment of the invention described below in detail, users are able to select a single source and target volume and/or to select blocks of source and target volumes using familiar computer controls, and users may also confirm their selections before committing to them. These volumes may be in the same or different storage subsystems. In addition, preferably, some error checking and/or error handling, for example, in the form of ensuring that the number of source volumes equals the number of target volumes, with an appropriate error message to alert the user to the problem, is also built into the tool of this invention.

BRIEF DESCRIPTION OF THE DRAWINGS

FIG. 2 illustrates a screen showing a graphical user interface for selecting and identifying copy pairs.

FIG. 3 shows another screen that identifies selected copy pairs.

DETAILED DESCRIPTION OF THE PREFERRED EMBODIMENTS

Figure 1:
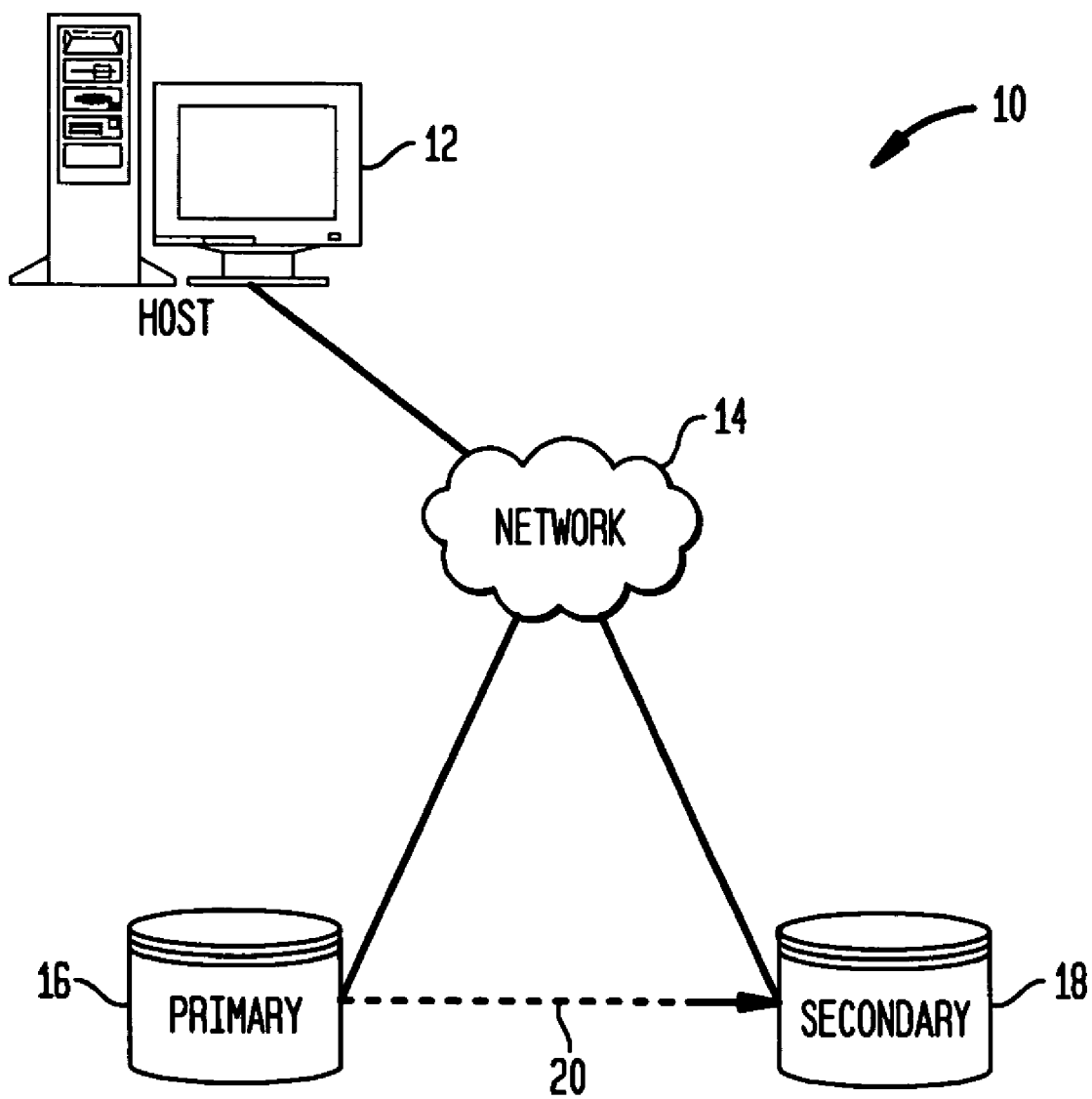
FIG. 1 is a diagram of a data processing system in which the present invention may be implemented.

FIG. 1 shows a diagram of a data processing system 10 in which the present invention may be implemented. System 10 includes a host 12, which has a connection to a network 14. Data may be stored by host 12 in primary storage system 16. Data written to primary storage system 16 is copied to secondary system 18 in these examples. The copy process is used to create a copy of the data in primary storage system 16 in secondary storage system 18. The copy process may be, for example, a peer-to-peer remote copy (PPRC) mechanism. In such a system, in the case of a synchronous remote copy, a write made by host 12 is considered complete only after the data written to primary storage system 16 is written to secondary system 18.

Host 12 may take various forms, such as a server on a network, a Web server on the Internet, or a mainframe computer. Primary storage system 16 and secondary storage system 18 are, for example, disk systems. Specifically, primary storage system 16 and secondary storage system 18 may each be set up as shared virtual arrays to increase the flexibility and manageability of data stored within these systems. Network 14 may take various forms, such as, for example, a local area network (LAN), a wide area network (WAN), the Internet, or an intranet. Network 14 contains various links, such as, for example, fiber optic links, packet switched communication links, enterprise systems connections (ESCON) fibers, small computer system interface (SCSI) cable, and wireless communication links. The present invention may be used with any suitable data storage subsystem. For example, one suitable system is the Enterprise Storage Server (ESS) from the International Business Machines Corporation.

FIG. 1 is intended as an example of a data processing system in which the present invention may be implemented and not as an architectural limitation to the present invention. For example, host 12 and primary storage system 16 may be connected directly while primary storage system 16 and secondary storage system 18 may be connected by a LAN or WAN. Further, primary storage system 16 and secondary storage system 18 may be connected to each other by a direct connection 20, rather than through network 14.

The present invention provides for a user friendly, graphical user interface to enable a user to establish a copy relationship between pairs of source and target volumes in primary and secondary storage systems 14 and 16 respectively. Generally, this is done by selecting such pairs in a single view including graphical depictions of the logical configurations of each of the subsystems, and implementing checks and alert messages regarding such pairings based on predefined rules. Preferably, these graphical depictions are side-by-side depictions in the single view, and, for example, these depictions may be hierarchical trees. In addition, preferably, some error checking and/or error handling, for example, in the form of ensuring that the number of source volumes equals the number of target volumes, with an appropriate error message to alert the user to the problem, is also built into the tool of this invention.

With the preferred embodiment of the invention, volumes or logical subsystems (LSS's) are selected in software task wizards to establish, withdraw, suspend, terminate or remove relationships. The selection of resources to include in copy relationships is done, for example, by using a mouse connected to host 12 to left click in Source and Target subsystem logical configuration trees. Users make source and target selections by left clicking the mouse once on all volumes/LSS's that they would like to create relationships between. A left click on a source resource results in, for instance, a blue highlight over that resource; and a left click on a target resource results in, for example, an orange highlight over that resource. Sources and Targets may be selected together and sequentially i.e., a Source, a Target, a Source, a Target, and so forth, and may be selected in successive pairs.

Users may also use common computer controls (such as the Shift and Control keys, along with mouse clicking) to select blocks of source and target resources. The number of source volumes must equal the number of target volumes when the user chooses (left clicking on the mouse) on a "Next" button at the bottom of the screen. If the number of source LSS's/volumes do not equal the number of target LSS's/volumes, the user is prompted with a message to indicate that the number of source volumes must equal the number of target volumes. A user must choose an "OK" button on this dialogue (there is no "Cancel" button) to dismiss the message and must correct the problem before continuing in the wizard.

In this preferred embodiment, users must first select a source before they select a target. The Next button only becomes available when at least one source and one target are selected. If a user deselects a target/s such that only a source/s are selected, the Next button becomes unavailable. The target side of the resource selection wizard panel is grayed out until a user selects a source.

Resources available in trees reflect product needs and limitations. For instance, because Paths (logical relationships for the purposes of data copying) can only be established between LSS's, the resource trees (where resources are volumes) in Paths wizards are only expanded to the LSS level and the default view is already expanded to the LSS level. Since point-in-time copies are at a volume level, the default view of ESS's is expanded to the LSS level. If a user selects a fixed block (FB) resource on the source side, all count key data (CKD) resources on the target side will be grayed out and vice versa. Users may only choose volumes from one LSS on the source side and one LSS on the target side (assuming that product limitations assume cross-LSS copies). If a user tries to select volumes from more than one LSS on the source side, they will receive an error message stating that they cannot choose volumes from more than one LSS. Resources on the source trees are never grayed out.

Preferably, source and target selections are reflected in both the source resource tree and the target resource tree. Sources can only be deselected from the source tree and targets can only be deselected from the target tree.

In addition, in the preferred embodiment, a mouse click on a selected resource toggles its selection state from selected to deselected and vice versa. If a user chooses a block of sources or targets using common controls (for example, using the Shift key and mouse click, or Control key and mouse click) and selects another source or another target, all other selections will be lost on the source or target tree. If a user selects a block of sources or targets and then clicks on a source or target within the block, the selection state of this resource will toggle from selected to deselected. Also, preferably, users can clear source selections, clear target selections, and clear source and target selections by choosing these options from a Tasks item in the product Menu Bar.

With reference to FIG. 2, as users select source and target volumes, paired volumes are visually indicated in the selections panel 24 by a number in a graphical representation. The number corresponds to the index position in the array where the pairings are stored (0-255). Users cannot directly adjust pairings on this panel.

In accordance with the preferred embodiment of this invention, two approaches are provided to facilitate copy pairing viewing. In one approach, the user of the product can view paired volumes while making pairing selections. As users select source and target volumes, paired volumes may be visually indicated by a number in a graphical representation. Again, the number may correspond to the index position in the array where the pairings are stored (0-255). Users cannot directly adjust pairings on this panel.

In the second approach, illustrated in FIG. 3, after choosing all volume pairs, the user is presented with a confirmation panel 26 where they can both view and change copy pairs. Copy pairs are presented in a tabular format with source volumes of the pair listed in a source column 30 and target volumes of the pair listed in a target column 32. Users can swap the target volume in one pair with a target volume in another pair within the confirmation panel by selecting the first target volume, selecting the second target volume, and then choosing the "Swap Targets" button 34. Users may also delete an entire pair by selecting a row in the confirmation panel table and choosing the delete key.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method for pairing source and target volumes for the purpose of copying data from the source volume to the target volume, comprising the steps:

graphically depicting representations of storage resources in a single view, including the step of displaying said graphical depictions side-by-side with a multitude of source volumes depicted on a first side of the view and a multitude of target volumes depicted on a second side of the view;

selecting a plurality of pairs of said storage resources using said single view, including, for each of said pairs, identifying one of said pair as the source volume from which data are to be copied, and identifying the other of said pair as the target volume to which the data are to be copied, including the steps of selecting a first source volume, then selecting a first target volume for said first source volume, then selecting a second source volume, then selecting a second target volume for the second source volume, and preventing the user from selecting the second source volume until the first target volume has been selected;

after said plurality of pairs have been selected and before copying any data from the source volumes to the target volumes, implementing checks to determine if said selected pairs satisfy predefined rules; and sending alert messages regarding said selected pairs if said selected pairs do not satisfy said predefined rules;

after selecting said pairs, displaying to the user a confirmation panel where the user is allowed to both view and change the volumes of said pairs, said confirmation panel comprises a table showing the source volumes on one side and the target volumes on another side; and the selecting step includes the further step of the user using said table to swap the target volume in one pair with the target volume in another pair within said confirmation panel; and the selecting step includes the step of a user manually identifying said source volumes and said target volumes; and wherein:

said storage resources are logical subsystems;

the user is allowed to only select volumes from one logical subsystem on a source side and one logical subsystem on a target side; and if the user tries to select volumes from more than one logical subsystem on the source side, the user receives an error message stating that the user cannot choose volumes from more than one logical subsystem.

2. A system for pairing source and target volumes for the purpose of copying data from the source volume to the target volume, comprising:

means for graphically depicting representations of storage resources in a single view, including displaying said graphical depictions side-by-side with a multitude of source volumes depicted on a first side of the view and a multitude of target volumes depicted on a second side of the view; and for selecting a plurality of pairs of said storage resources using said single view, including for each of said pairs, identifying one of said pair as the source volume from which data are to be copied, and identifying the other of said pair as the target volume to which the data are to be copied, including selecting a first source volume, then selecting a first target volume for said first source volume, then selecting a second source volume, then selecting a second target volume for the second source volume, and preventing the user from selecting the second source volume until the first target volume has been selected;

means for implementing, after said plurality of pairs have been selected and before copying any data from the source volumes to the target volumes, checks to determine if said selected pairs satisfy predefined rules, and for sending alert messages regarding said selected pairs if said selected pairs do not satisfy said predefined rules; and wherein:

after selecting said pair, the user is presented with a display of a confirmation panel where the user is allowed to both view and change the volumes of said pairs, said confirmation panel comprises a table showing the source volumes on one side and the target volumes on another side; and the means for graphically depicting includes means for using said table to swap the target volume in one pair with the target volume in another pair within said confirmation panel;

the means for graphically depicting includes means to enable a user to manually identify said source volumes and said target volumes;

said storage resources are logical subsystems;

the user is allowed to only select volumes from one logical subsystem on a source side and one logical subsystem on a target side; and if the user tries to select volumes from more than one logical subsystem on the source side, the user receives an error message stating that the user cannot choose volumes from more than one logical subsystem.

3. A program storage device readable by a computer, tangibly embodying a program of instructions executable by the computer to perform program steps for pairing source and target volumes for the purpose of copying data from the source volume to the target volume, said program steps comprising:

graphically depicting representations of storage resources in a single view, including the step of displaying said graphical depictions side-by-side with a multitude of source volumes depicted on a first side of the view and a multitude of target volumes depicted on a second side of the view;

selecting a plurality of pairs of said storage resources using said single view, including for each of said pairs, identifying one of said pair as the source volume from which data are to be copied, and identifying the other of said pair as the target volume to which the data are to be copied, including selecting a first source volume, then selecting a first target volume for said first source volume, then selecting a second source volume, then selecting a second target volume for the second source volume, and preventing the user from selecting the second source volume until the first target volume has been selected;

after said plurality of pairs have been selected and before copying any data from the source volumes to the target volumes, implementing checks to determine if said selected pairs satisfy predefined rules; and sending alert messages regarding said selected pairs if said selected pairs do not satisfy said predefined rules;

after selecting said pairs, displaying to the user a confirmation panel where the user is allowed to both view and change the volumes of said pairs, said confirmation panel comprises a table showing the source volumes on one side and the target volumes on another side; and the selecting step includes the further step of the user using said table to swap the target volume in one pair with the target volume in another pair within said confirmation panel;

the selecting step includes the step of a user manually identifying said source volumes and said target volumes;

said storage resources are logical subsystems;

the user is allowed to only select volumes from one logical subsystem on a source side and one logical subsystem on a target side;

if the user tries to select volumes from more than one logical subsystem on the source side, the user receives an error message stating that the user cannot choose volumes from more than one logical subsystem.

* * * * *